United States Patent [19]

Shibuya et al.

[11] 4,448,490
[45] May 15, 1984

[54] LIQUID CRYSTAL MATRIX DISPLAY CELLS PILED WITH NON-OVERLAPPING DISPLAY ELEMENTS

[75] Inventors: Yoshimichi Shibuya; Masami Takahashi, both of Mobara, Japan

[73] Assignee: Hitachi, Ltd., Tokyo, Japan

[21] Appl. No.: 233,867

[22] Filed: Feb. 12, 1981

[30] Foreign Application Priority Data

Apr. 23, 1980 [JP] Japan .................................. 55-52969

[51] Int. Cl.³ .............................................. G02F 1/33
[52] U.S. Cl. .................................... 350/335; 340/784
[58] Field of Search ............... 350/333, 334, 332, 335; 340/765, 784

[56] References Cited

U.S. PATENT DOCUMENTS

| | | | |
|---|---|---|---|
| 3,848,247 | 11/1974 | Sherr | 350/333 X |
| 3,975,726 | 8/1976 | Kawakami | 340/765 X |
| 4,110,794 | 8/1978 | Lester et al. | 340/765 |
| 4,359,729 | 11/1982 | Nonomuraeth | 350/333 X |

FOREIGN PATENT DOCUMENTS 2050032 12/1980 United Kingdom ............... 340/784

*Primary Examiner*—John K. Corbin
*Assistant Examiner*—David Lewis
*Attorney, Agent, or Firm*—Antonelli, Terry & Wands

[57] ABSTRACT

A liquid crystal display device having a plurality of display sections each formed of a plurality of common electrodes and corresponding segment electrodes to display a character is disclosed. The device comprises a plurality of liquid crystal display elements piled in the direction perpendicular to the display surface of the device. Each of the liquid crystal display elements includes ones selected from the above-mentioned common electrodes and segment electrodes corresponding to the selected common electrodes to reduce the number of common electrodes included in each liquid crystal display element, thereby reducing the number of common electrode leads provided in each liquid crystal display element.

7 Claims, 12 Drawing Figures

LIQUID CRYSTAL MATRIX DISPLAY CELLS PILED WITH NON-OVERLAPPING DISPLAY ELEMENTS

The present invention relates to a liquid crystal display device, and more particularly to a dot-matrix type liquid crystal display device in which the power consumption is small and the field of viewing the display surface can be improved.

The prior art and the present invention and the advantages of the latter will be described in detail with reference to the accompanying drawings, in which.

Figure 6:
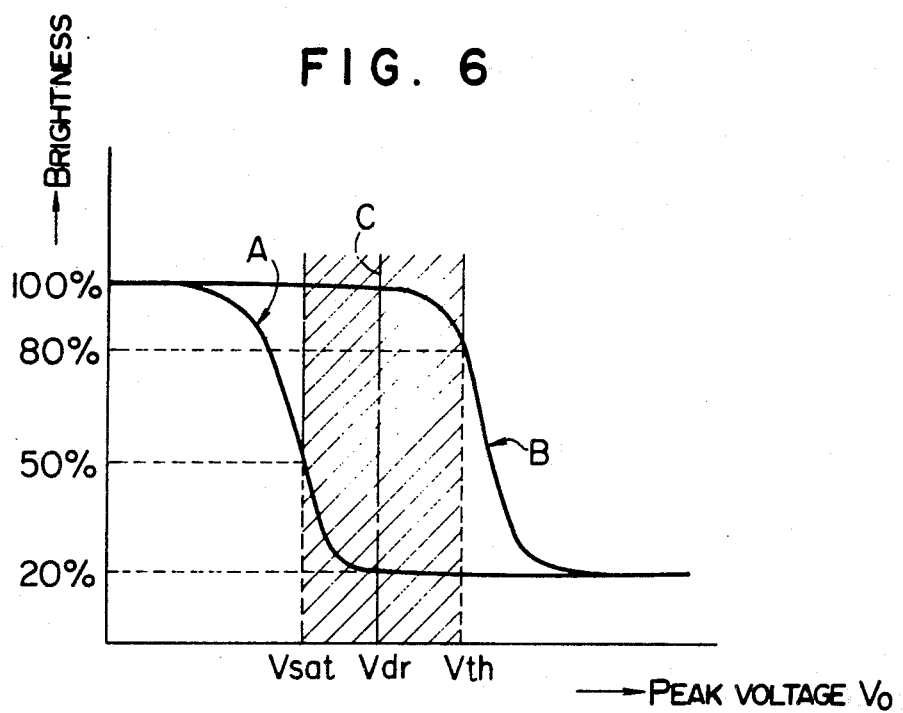
Figure 7:
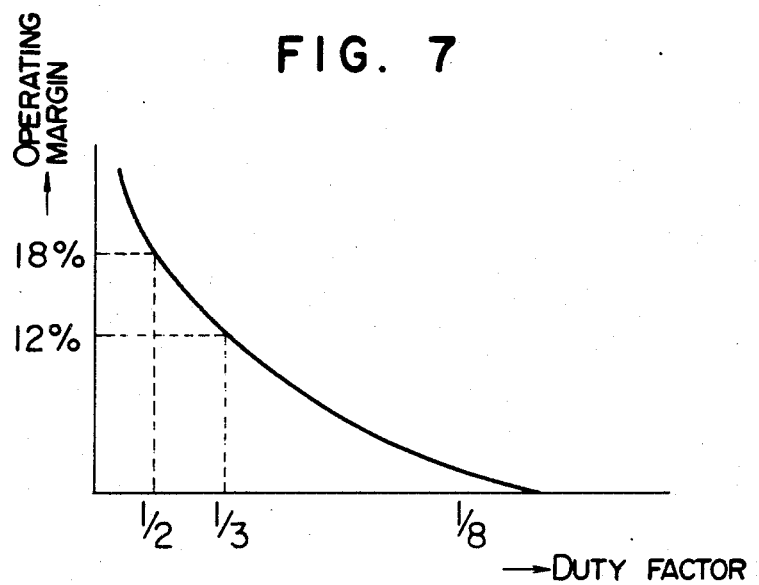
Figure 8:
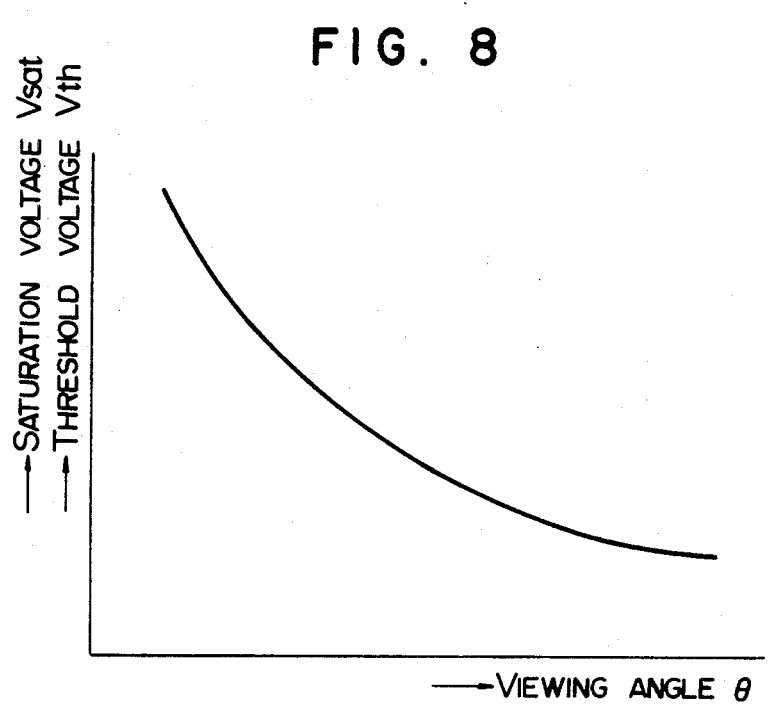
Figure 10:
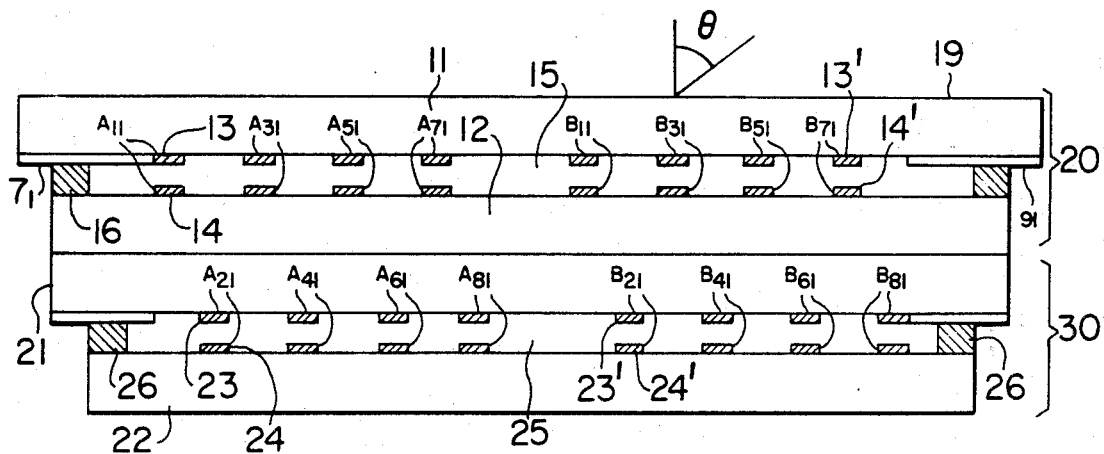
Figure 9A:
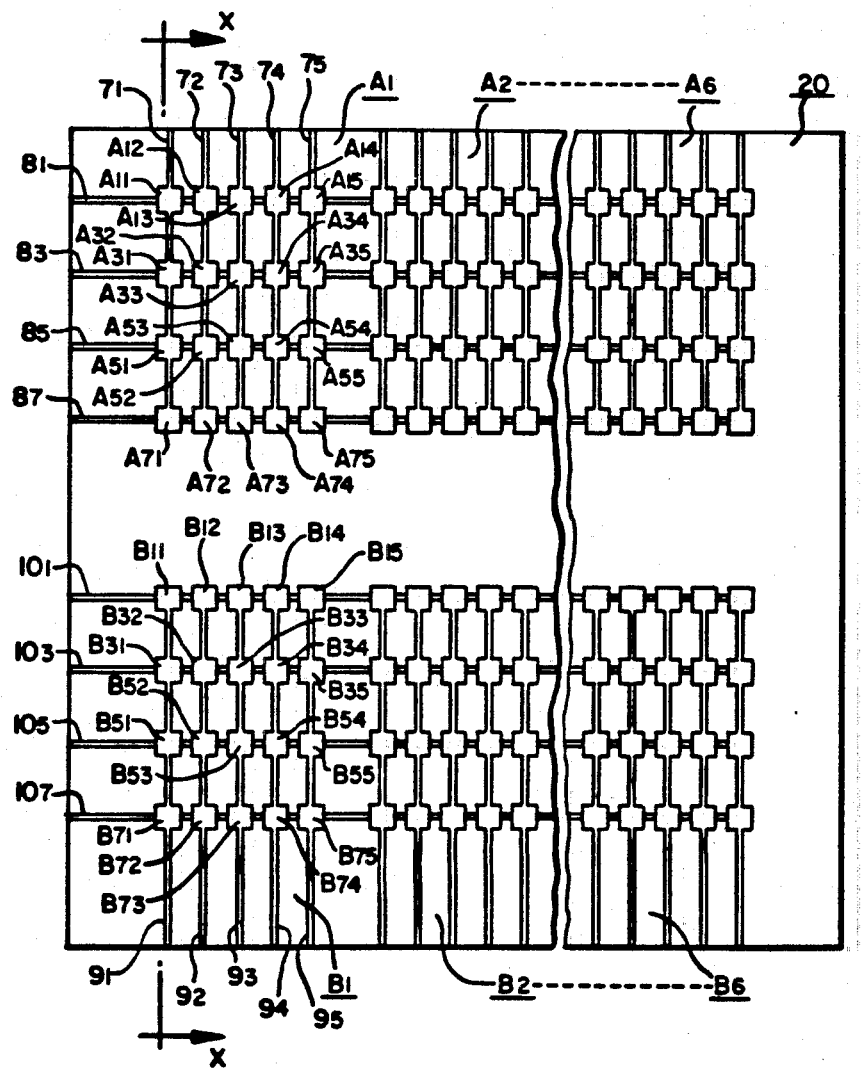
Figure 9B:
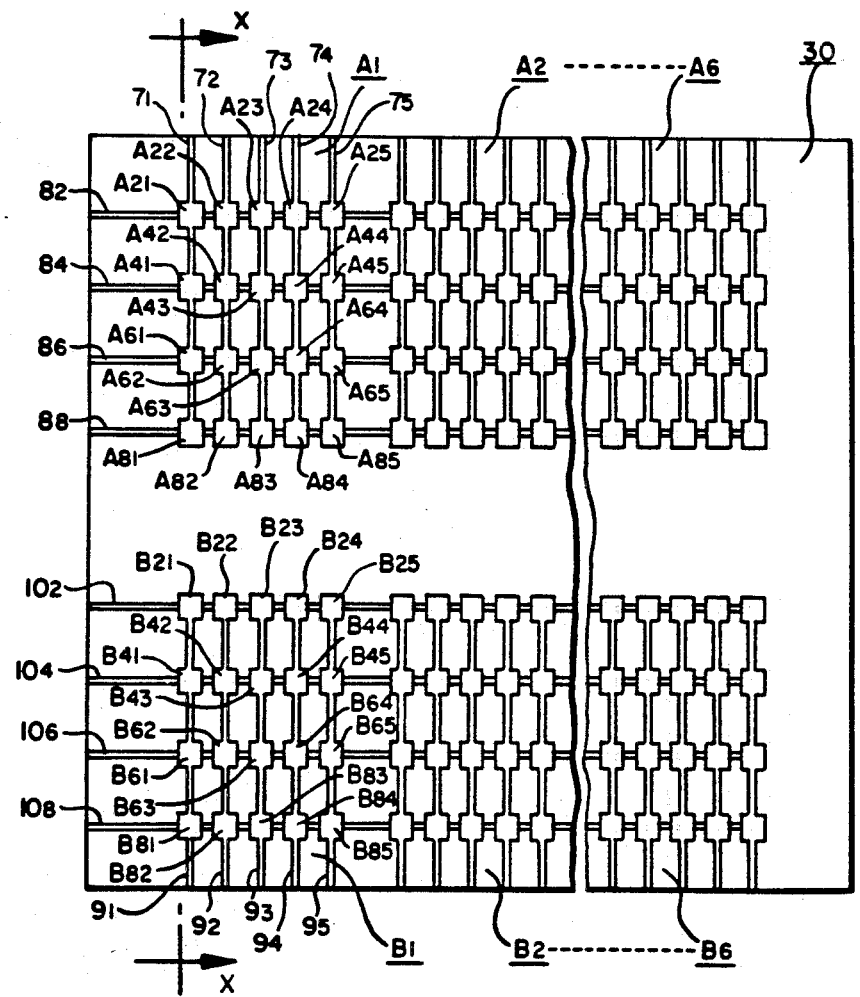
Figure 11:
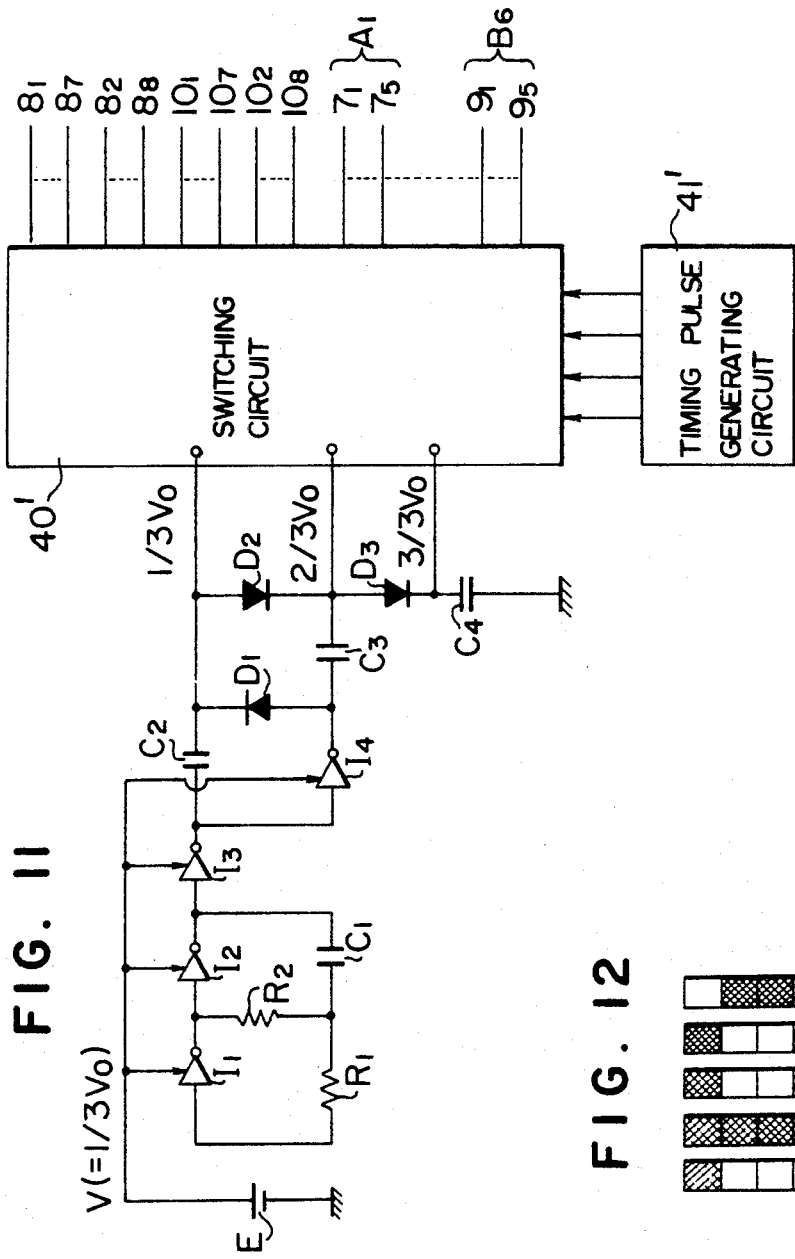
Figure 12:
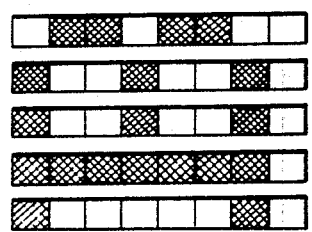

FIG. 6 graphically shows a relationship between the peak voltage and the brightness to explain the operating margin;

FIG. 7 is a graph showing a relationship between the driving method and the operating margin;

FIG. 8 is a graph showing a relationship between the viewing angle and the saturation and threshold voltages;

FIGS. 9a and 9b show plan view of the electrode arrangment in different liquid crystal display elements in an embodiment of a liquid crystal display device according to the present invention;

FIG. 10 is a sectional view taken along the line X—X of FIG. 9;

FIG. 11 is a circuit diagram showing an example of a power circuit used in the liquid crystal display device shown in FIGS. 9 and 10; and FIG. 12 is a view showing a display pattern in a display section of the liquid crystal display device shown in FIGS. 9 and 10.

Figure 1:
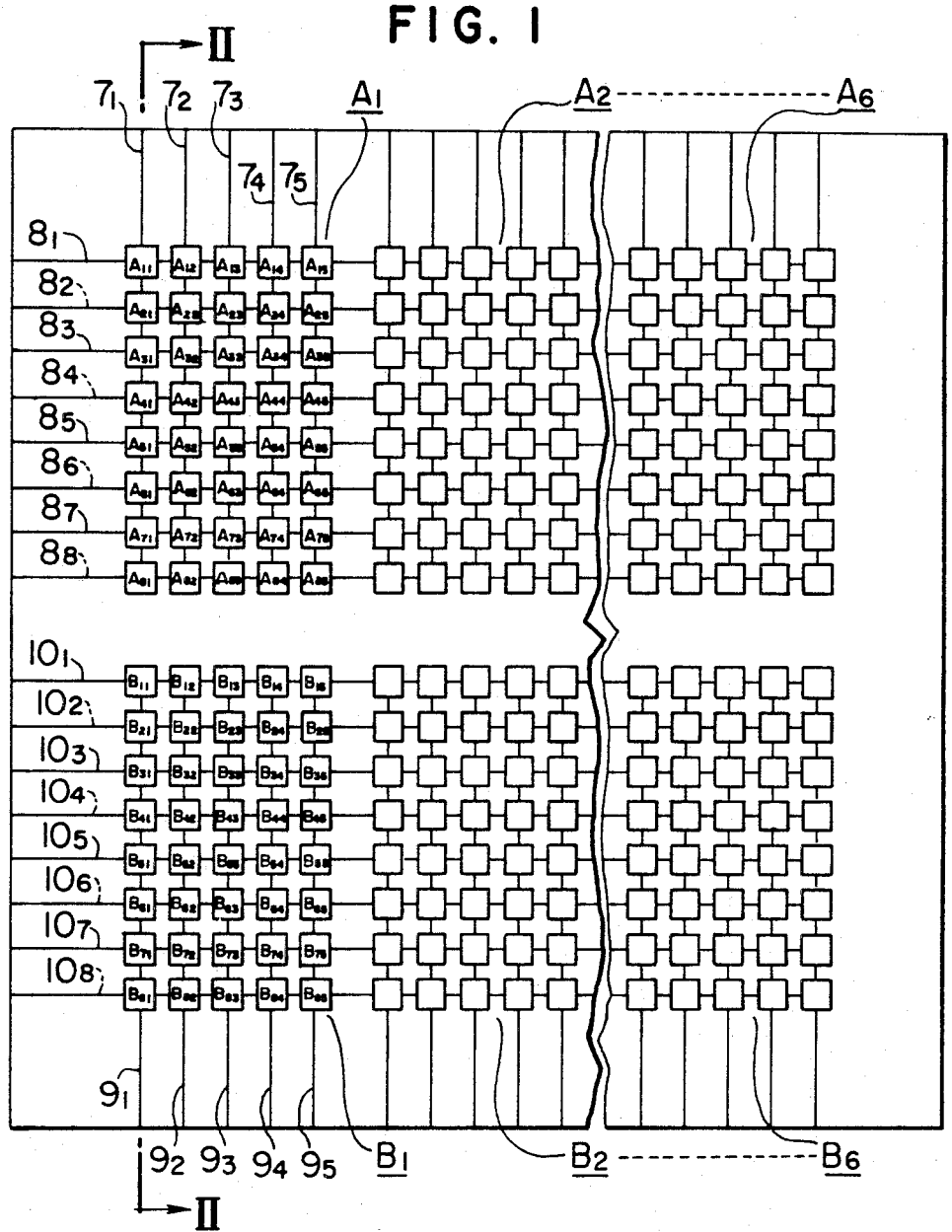
FIG. 1 is a plan view showing the electrode arrangement in an example of a conventional dot-matrix type liquid crystal display device.
Figure 2:
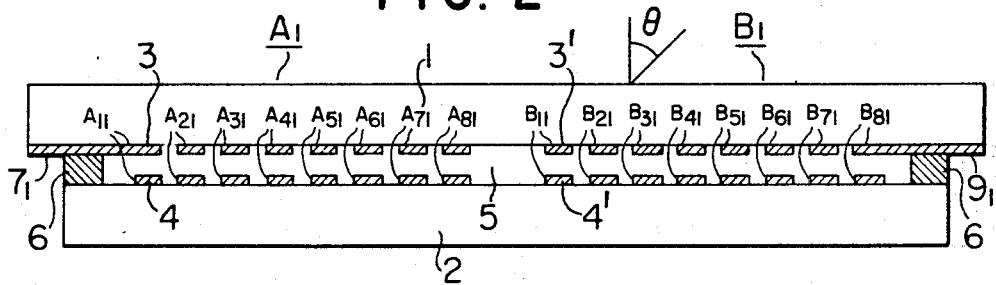
FIG. 2 is a sectional view taken along the line II—II of FIG. 1.

The liquid crystal display device shown in FIGS. 1 and 2 includes 12 display sections arranged in two rows and six columns. The above-mentioned display device has upper and lower substrates 1 and 2 which are placed opposite to each other and each of which is formed of a transparent glass plate. On the facing surfaces of the upper and lower substrates 1 and 2 are formed segment electrodes 3 and 3' and common electrodes 4 and 4'. The segment and common electrodes are formed of transparent conductive films and arranged so that a $5 \times 8$-dot matrix is formed in each display section. The upper and lower substrates 1 and 2 are spaced apart from each other by a predetermined distance by means of a sealing agent 6. The space enclosed with the upper and lower substrates 1 and 2 and the sealing agent 6 is filled with a liquid crystal material 5. Each pair of facing segment and common electrodes form one dislay dot, and such display dots are arranged to form a $5 \times 8$-dot matrix in each display section. Accordingly, 40 display dots display one character in one display section.

In more detail, one of display sections $A_1$ to $A_6$ in the first row, for example, the display section $A_1$ includes display dots $A_{11}$ to $A_{81}$, $A_{12}$ to $A_{82}$, ..., and $A_{15}$ to $A_{85}$, each of which is formed of facing segment and common electrodes 3 and 4. While, one of display sections $B_1$ to $B_6$ in the second row, for example, the display section $B_1$ includes display dots $B_{11}$ to $B_{81}$, $B_{12}$ to $B_{82}$, ..., and $B_{15}$ to $B_{85}$, each of which is formed of facing segment and common electrodes 3' and 4'.

Respective segment electrodes 3 of the display dots $A_{11}$ to $A_{81}$, $A_{12}$ to $A_{82}$, ..., and $A_{15}$ to $A_{85}$, which make up the display section $A_1$, are connected to one of segment electrode leads $7_1$ to $7_5$. In more detail, the segment electrodes 3 of the display dots $A_{11}$ to $A_{81}$, those of the display dots $A_{12}$ to $A_{82}$, those of the display dots $A_{13}$ to $A_{83}$, those of the display dots $A_{14}$ to $A_{84}$ and those of the display dots $A_{15}$ to $A_{85}$ are connected to the leads $7_1$, $7_2$, $7_3$, $7_4$ and $7_5$, respectively. Further, the common electrodes 4 of the display dots $A_{11}$ to $A_{15}$, those of the display dots $A_{21}$ to $A_{25}$, those of the display dots $A_{31}$ to $A_{35}$, those of the display dots $A_{41}$ to $A_{45}$, those of the display dots $A_{51}$ to $A_{55}$, those of the display dots $A_{61}$ to $A_{65}$, those of the display dots $A_{71}$ to $A_{75}$ and those of the display dots $A_{81}$ to $A_{85}$ are connected to common electrode leads $8_1$, $8_2$, $8_3$, $8_4$, $8_5$, $8_6$, $8_7$ and $8_8$, respectively. Each of the display sections $A_2$ to $A_6$ included in the first row has the same structure as the display section $A_1$. In each of the display sections $A_1$ to $A_6$ included in the first row, the common electrodes 4 are divided into eight groups which are arranged in respective rows, and the corresponding groups of the display sections $A_1$ to $A_6$ are commonly connected to the corresponding one of the common electrode leads $8_1$ to $8_8$. On the other hand, in each of the display sections $A_1$ to $A_6$, the segment electrodes 3 are divided into five groups which are arranged in respective columns, and the five segment electrode leads are provided for the five groups of the segment electrodes, that is, one of the segment electrode groups is connected to the corresponding one of the segment electrode leads. The display sections $B_1$ to $B_6$ in the second row have the same structure as the display sections $A_1$ to $A_6$. That is, common electrode leads $10_1$ to $10_8$ are provided which are common to the display sections $B_1$ to $B_6$, and segment electrode lead wires $9_1$ to $9_5$ are provided for each of the display sections $B_1$ to $B_6$.

Figure 3:
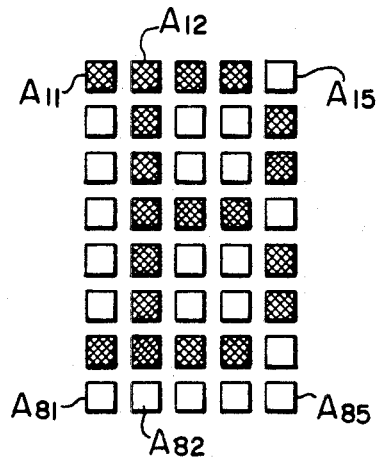
FIG. 3 is a view showing a display pattern in a display section of the liquid crystal display device shown in FIGS. 1 and 2.

The segment electrodes 3 and 3' and the common electrodes 4 and 4' are applied with voltages having predetermined waveforms through the segment electrode leads and the common electrode leads, and thus the orientation of liquid crystal molecules in regions corresponding to a plurality of display dots is selectively varied to obtain a desired display arranged in two rows and six columns. Each of the display sections displays one character. For example, when the display section $A_1$ displays the character "B", there is obtained such a pattern as shown in FIG. 3.

Figure 4:
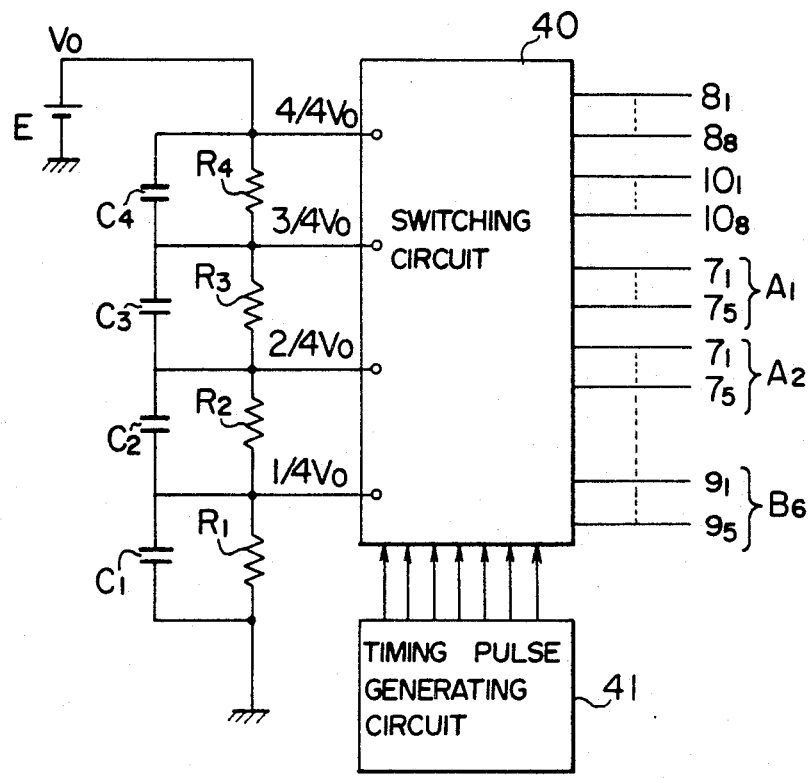
FIG. 4 is a circuit diagram showing an example of a power circuit used in the liquid crystal display device shown in FIGS. 1 and 2.

According to the conventional driving system, the above-mentioned liquid crystal display device can be driven by a driving method of $\frac{1}{3}$ bias with a duty factor of $\frac{1}{8}$ to $\frac{1}{4}$ bias with a duty factor of $\frac{1}{16}$. As is known from the optimum bias method, when the reciprocal of the duty factor and the reciprocal of the optimum bias value are expressed by N and B, respectively, a relation $B = \sqrt{N} + 1$ holds. Accordingly, the above device is driven, in usual, by a driving method of $\frac{1}{4}$ bias with $\frac{1}{8}$ duty factor. In this case, a power circuit such as shown in FIG. 4 is employed. In more detail, a supply voltage $V_o$ is applied to an RC parallel circuit, which includes resistors $R_1$, $R_2$, $R_3$ and $R_4$ and capacitors $C_1$, $C_2$, $C_3$ and $C_4$, to obtain bias voltages $\frac{1}{4} V_o$, $2/4 V_o$, $\frac{3}{4} V_o$ and $4/4 V_o$. Namely, the supply voltage $V_o$ is divided by a resistance type voltage division. The bias voltages thus obtained are applied through a switching circuit 40 to the common electrode leads $8_1$ to $8_8$ and $10_1$ to $10_8$ and the segment electrode leads $7_1$ to $7_5$ and $9_1$ to $9_5$, to drive the device. The switching circuit 40 is controlled by the output of a timing pulse generating circuit 41, and determines the waveform of voltage applied to each electrode lead. For example, in case where the common electrode lead $8_1$ and the segment electrode lead $7_1$ of the display section $A_1$ are applied with voltages (a) and (d) shown in FIG. 5, respectively, a potential difference (g) shown in FIG. 5 appears between the segment and common electrodes 3 and 4 which form the display dot $A_{11}$, and therefore the display dot $A_{11}$ "turns on". Further, in case where the common electrode lead $8_2$ and the segment electrode lead $7_2$ of the display section $A_1$ are applied with voltages (b) and (e) shown in FIG. 5, respectively, a potential difference (h) shown in FIG. 5 appears between the segment and common electrodes 3 and 4 forming the display dot $A_{22}$, and therefore the display dot $A_{22}$ "turns on". However, in case where the common electrode lead $8_3$ and the segment electrode lead $7_4$ of the display section $A_1$ are applied with voltages (c) and (f) shown in FIG. 5, respectively, a potential difference (i) shown in FIG. 5 appears between the segment and common electrodes forming the display dot $A_{34}$, and therefore the display dot $A_{34}$ does not turn on. As mentioned above, the voltages having predetermined waveforms are selectively applied between the common electrode and the corresponding segment electrode to drive the liquid crystal display device in a time divisional fashion. The timing pulse generating circuit 41 is controlled by the manual operation of a keyboard (not shown) or by the results of an arithmetic operation for the input obtained by the manual operation of the keyboard, and generates pulse signals having predetermined sequences.

In the power circuit employing such a resistance type voltage divider, a power source has to supply the RC parallel circuit shown in FIG. 4 with a current which is several or several tens of times as large as a load current, in order to generate stable bias voltages without being affected by variations in load, for example, a change in the number of display dots. Therefore, the power consumption in the RC parallel circuit becomes large and it may be said that the whole power consumption of the device is determined by that of the RC parallel circuit. Further, when the device is driven by the driving method of $\frac{1}{4}$ bias with $\frac{1}{8}$ duty factor the operating margin is very small as compared with a case where the device is driven by the driving method of $\frac{1}{3}$ bias with a duty factor of $\frac{1}{3}$, which is used in an ordinary watch, an electronic desk calculator, and the like, since the bias value is smaller and the number of time divisions is larger. As a result, when a viewing angle $\theta$ (shown in FIG. 2) formed between the normal to the display surface of the liquid crystal display device and a direction in which the display surface is viewed, is large, there is produced the phenomenon that a display dot applied with the non-selection voltage waveform (i) shown in FIG. 5 looks as if turned on, that is, a crosstalk is generated. Further, in case where the visual angle $\theta$ is small, that is, the display surface is viewed in substantially normal direction, a display dot applied with the selection voltage waveform (g) or (h) shown in FIG. 5 (or a selected dot) lowers the contrast of display to a large extent. Now, the above-mentioned matters will be explained below with reference to FIGS. 6, 7 and 8.

FIG. 6 shows a relationship between the brightness at the display dot and the peak voltage $V_o$ obtained by the power circuit shown in FIG. 4 or that shown in FIG. 11 described later. In FIG. 6, the curve A indicates a characteristic in case where the selection voltage waveform is applied to the display dot, and the curve C indicates a characteristic in case where the non-selection voltage waveform is applied to the display dot. The peak voltage $V_o$ is equal to the voltage of a battery E when the power circuit shown in FIG. 4 is employed, and equal to the maximum voltage, which is three times as high as the voltage of a battery E, obtained when the power circuit shown in FIG. 11 is employed. The brightness is expressed by 100% when the orientation of liquid crystal molecules is not subjected to any change. A voltage at a point on the curve A corresponding to the brightness of 50% and a voltage at a point on the curve B corresponding to the brightness of 80% are taken as a saturation voltage $V_{sat}$ and a threshold voltage $V_{th}$, respectively, and the operating margin M is defined by the following equation:

$$M = \frac{V_{th} - V_{sat}}{V_{th} + V_{sat}} (\%)$$

The operating margin may be shown in the Figure by the hatched area. A driving voltage $V_{dr}$ is set between the saturation voltage $V_{sat}$ and the threshold voltage $V_{th}$ so that the display dots applied with the selection voltage waveform (that is, the selected points) have a brightness of about 20% and other display dots have a brightness of 100%. In case where the operating margin is large, the brightness of the selected or non-selected point does not vary even when the curves A and B are shifted to some extent in the direction of the abscissa. In case where the operating margin is small, however, according as the curve A or B is slightly shifted, the position of an intersecting point of the curve A or B with a straight line C, which is perpendicular to the abscissa at a point indicating the driving voltage $V_{dr}$, varies and therefore the brightness of the selected or non-selected point is varied. FIG. 7 is a graph showing a relationship between the operating margin and the driving method. As shown in FIG. 7, the operating margin becomes small as the duty factor is smaller, provided that the optimum bias values are taken for the respective duty factors.

The saturation voltage $V_{sat}$ and the threshold voltage $V_{th}$ vary with the direction in which the display surface is viewed. FIG. 8 is a graph showing a relationship between the viewing angle $\theta$ (which is formed between the viewing direction and the normal to the display surface) and the saturation and threshold voltages $V_{sat}$ and $V_{th}$. As shown in FIG. 8, both the saturation voltage $V_{sat}$ and the threshold voltage $V_{th}$ becomes low as the viewing angle $\theta$ is larger. Accordingly, in case where the viewing angle $\theta$ is large, the threshold voltage $V_{th}$ shown in FIG. 6 moves to the left, that is, the curve B is shifted to the left. In this case, if the operating margin is small, the brightness of the intersecting point of the curve B with the line C becomes low. In other words, the non-selected display dot, which is applied with the non-selection voltage waveform based on the driving voltage $V_{dr}$, looks as if turned on. That is, a crosstalk is generated. On the other hand, in a case where the viewing angle $\theta$ is small, the saturation voltage $V_{sat}$ shown in FIG. 6 moves to the right, that is, the curve A is shifted to the right. If the operating margin is small, the brightness of the intersecting point of the curve A with the line C becomes high. Thus, the difference in brightness between a selected display dot applied with the selection voltage waveform based on the driving voltage $V_{dr}$ and non-selected display dots arranged in the neighborhood of the selected display dot, becomes small, and therefore the contrast of the display is lowered.

As has been explained in the foregoing, the conventional dot-matrix type liquid crystal display device has drawbacks that the power consumption is large, and moreover the display is difficult to be observed, in other words, the field of viewing the display is narrow.

The above-mentioned difficulties arise not only in the dot-matrix type liquid crystal display device, but also in case where a segment type liquid crystal display device, each display section of which has eight segment electrodes corresponding to seven sides for forming the numeral "8" and one dot, is driven by a multiplexing driving method.

Accordingly, it is an object of the present invention to provide a multi-layered liquid crystal display device which is low in power consumption and wide in the field of viewing the display.

In order to attain the above object, according to the present invention, a liquid crystal display device is divided into a plurality of liquid crystal display elements, which are piled in the direction perpendicular to the display surface of the liquid crystal display device to form a multi-layer structure, common electrodes and segment electrodes in each display section are divided into a plurality of groups, which are allotted to the liquid crystal display elements to reduce the number of common electrode leads in each liquid crystal display element, and thus the duty factor and bias value for driving in time divisional fashion each liquid crystal display element are increased, thereby the operating margin being made large.

Now, the present invention will be explained below in detail using an embodiment thereof.

FIG. 9 (FIGS. 9a and 9b) is a plan view showing the electrode arrangement in an embodiment of a dot-matrix type liquid crystal display device according to the present invention, and FIG. 10 is a sectional view of the embodiment shown in FIG. 9. Like numerals in FIGS. 1, 2, 9 and 10 refer to like elements, and therefore explanation of these numerals is omitted.

Referring to FIGS. 9 and 10, an upper substrate 11 and a lower substrate 12 are placed opposite to each other, and each of the substrates 11 and 12 is formed of a transparent glass plate. On the facing surfaces of the substrates 11 and 12 are formed segment electrodes 13 and 13' and common electrodes 14 and 14'. The segment and common electrodes are formed of transparent conductive films, and one of the segment electrodes and the corresponding one of the common electrodes face each other to form a display dot. A liquid crystal material 15 is disposed between the substrates 11 and 12, and this structure is sealed at the peripheral portion thereof with a sealing agent to form a first liquid crystal display element 20. On the back of the first liquid crystal display element 20, a second liquid crystal display element 30 is closely disposed in a two layer structure with the first liquid display element 20 so that the first and second elements 20 and 30 overlap each other in the direction perpendicular to the display surface 19 of the liquid crystal display device. The second element 30 includes similarly to the first element 20 an upper substrate 21, a lower substrate 22, segment electrodes 23 and 23', common electrodes 24 and 24', a liquid crystal material 25 and a sealing agent 26, which are made of the same material as the upper substrate 11, the lower substrate 12, the segment electrodes 13 and 13', the common electrodes 14 and 14', the liquid crystal material 15 and the sealing agent 16, respectively. In the first liquid crystal display element 20 are provided those display dots which correspond to alternate display dots in a predetermined display dot arrangement such as shown in FIG. 1. Each of the display dots in the first element 20 is formed of one of the segment electrodes 13 and 13' and the corresponding one of the common electrodes 14 and 14' facing the segment electrode. In more detail, the first liquid crystal display element 20 includes segment electrode leads $7_1$ to $7_5$ for each of display sections $A_1$ to $A_6$ arranged in the first row, and includes segment electrode leads $9_1$ to $9_5$ for each of display sections $B_1$ to $B_6$ arranged in the second row. However, the first element 20 includes only common electrode leads $8_1$, $8_3$, $8_5$, $8_7$, $10_1$, $10_3$, $10_5$ and $10_7$. Thus, as shown in FIG. 9a for example, as regards the display section $A_1$, there are formed in the first liquid crystal display element 20 display dots $A_{11}$ to $A_{15}$, $A_{31}$ to $A_{35}$, $A_{51}$ to $A_{55}$ and $A_{71}$ to $A_{75}$, and as regards the display section $B_1$, there are formed in the first element 20 display dots $B_{11}$ to $B_{15}$, $B_{31}$ to $B_{35}$, $B_{51}$ to $B_{55}$ and $B_{71}$ to $B_{75}$. Further, in the second liquid crystal display element 30 are provided, as shown in FIG. 9b those display dots which correspond to other alternate display dots in the predetermined display dot arrangement and each of which is formed of facing ones of the segment electrodes 23 and 23' and the common electrodes 24 and 24'. The display dots provided in the second liquid crystal display element 30 are placed at positions corresponding to gaps between the display dots provided in the first liquid crystal display element 20. Accordingly, the second liquid crystal display element 30 includes segment electrode leads $7_1$ to $7_5$ for each of the display sections $A_1$ to $A_6$ arranged in the first row and includes segment electrode leads $9_1$ to $9_5$ for each of the display sections $B_1$ to $B_6$ arranged in the second row, but includes only common electrode leads $8_2$, $8_4$, $8_6$, $8_8$, $10_2$, $10_4$, $10_6$ and $10_8$. Thus, as regards the display section $A_1$, there are formed in the second liquid crystal display element 30 display dots $A_{21}$ to $A_{25}$, $A_{41}$ to $A_{45}$, $A_{61}$ to $A_{65}$ and $A_{81}$ to $A_{85}$, and as regards the display section $B_1$, there are formed in the second element 30 display dots $B_{21}$ to $B_{25}$, $B_{41}$ to $B_{45}$, $B_{61}$ to $B_{65}$ and $B_{81}$ to $B_{85}$.

According to the above-mentioned electrode arrangement, the common electrodes are provided in every other row for the display sections included in each of the first and second liquid crystal display elements 20 and 30. In other words, each of two display rows (one of which includes the display sections $A_1$ to $A_6$ and the other includes the display sections $B_1$ to $B_6$) includes four common electrode leads, and therefore each of the elements 20 and 30 can be driven with the duty factor of ¼. In this case, the optimum bias value for avoiding a decrease in operating margin is equal to ⅓ on the basis of the previously-mentioned relation $B = \sqrt{N} + 1$. That is, each element can be driven by the driving method of ⅓ bias with ¼ duty factor. Accordingly, the operating margin is larger as compared with the driving method of ½ bias with ½ duty factor explained in conjunction with FIGS. 1 and 2. Further, in case where the ⅓ bias method is employed, only three kinds of bias voltages are required. Accordingly, a power circuit can be used which includes a boosting circuit (or the so-called tripler) such as shown in FIG. 11. The boosting circuit includes an oscillator part and a boosting part. The oscillator part is composed of inverters $I_1$ and $I_2$, resistors $R_1$ and $R_2$ and a capacitor $C_1$, and the boosting part includes inverters $I_3$ and $I_4$, capacitors $C_2$, $C_3$ and $C_4$ and diodes $D_1$, $D_2$ and $D_3$. When the voltage of the battery E is equal to V (or ⅓ $V_o$), voltages V (or ⅓ $V_o$), 2 V (or ⅔ $V_o$) and 3 V (or 3/3 $V_o$) are obtained at the junction of the capacitor $C_2$ and the diode $D_2$, the junction of the capacitor $C_3$ and the diode $D_3$ and the junction of the capacitor $C_4$ and the diode $D_3$, respectively. The voltage of the battery E may be 1.5 V as usual. This power circuit is used commonly for driving both the first and second liquid crystal display elements 20 and 30.

Figure 5:
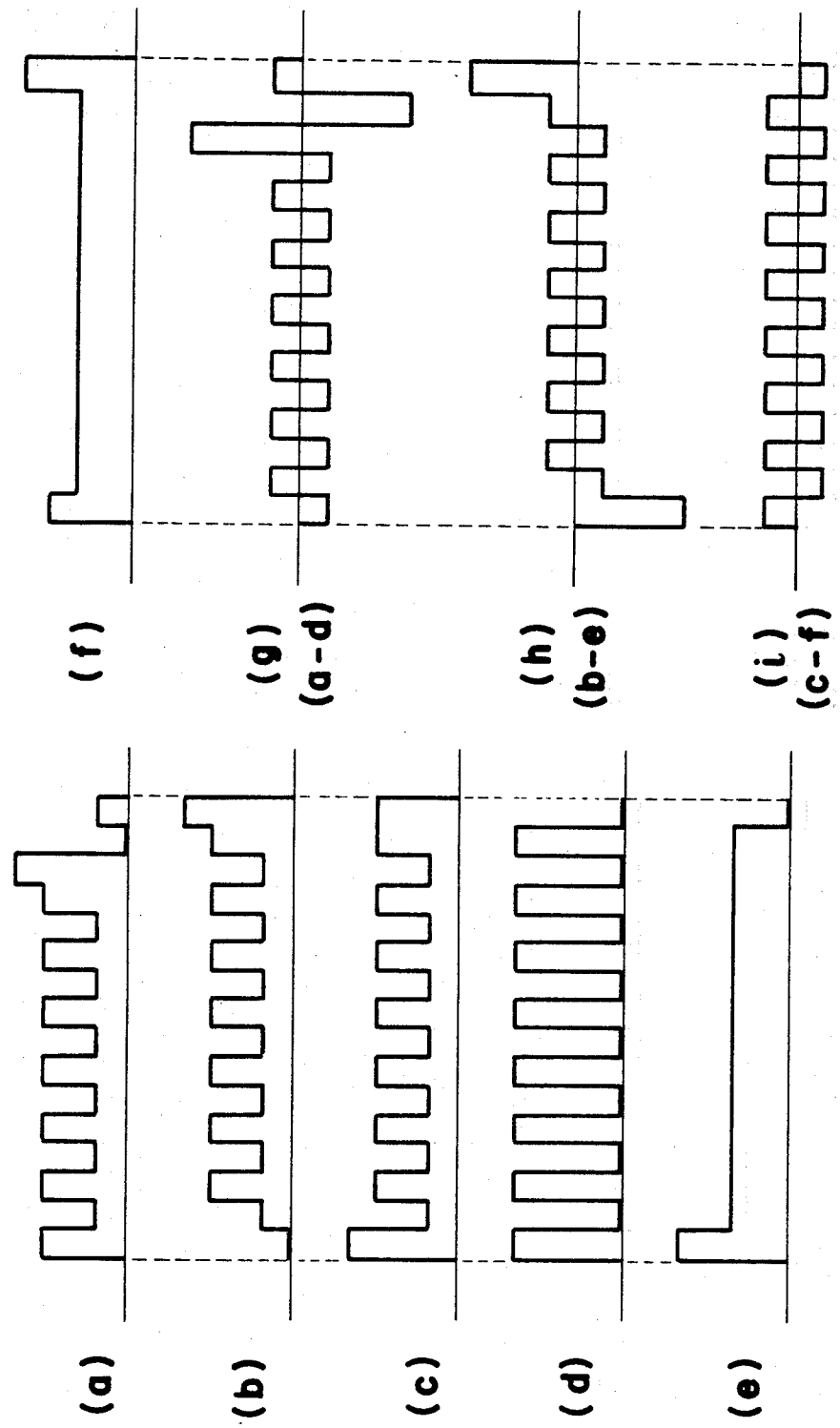
FIG. 5 shows examples of voltage waveforms applied to electrodes provided in the liquid crystal display device shown in FIGS. 1 and 2.

A switching circuit 40' and a timing pulse generating circuit 41' are similar to the switching circuit 40 and the timing pulse generating circuit 41 shown in FIG. 4, respectively. The voltage waveforms (g), (h) and (i) shown in FIG. 5 are formed by the circuits 40' and 41', and are selectively applied between the common and segment electrodes constituting pairs through the common electrode leads and segment electrode leads to drive each of the first and second liquid crystal display elements in a time divisional fashion. Because of the capacity of an ordinary battery for use in watch and the load current, it is very difficult to make a boosting circuit including four or more capacitors. Accordingly, the ¼ bias method which requires four kinds of bias voltages such as shown in FIG. 4, cannot employ such a boosting circuit. According to the present invention, the power circuit does not include the resistance type voltage divider, but includes the boosting circuit. Therefore, the power consumption is less than about one-tenth of that in the conventional device. Further, unlike the conventional device, the common electrodes are provided in each other row. Accordingly, in each display section in each of the first and second liquid crystal display elements, the spacing between adjacent common electrodes in each column of display dots (each of which is about 500 μm × 500 μm in size) can be made equal to about 500 μm, though the above spacing is about 100 μm in the conventional device. Thus, adjacent common electrodes in each column of display dots are never brought into contact with each other. Furthermore, in case where that spacing between adjacent common electrodes in each column of display dots which is observed when the display surface 19 of the liquid crystal display device including the first and second elements 20 and 30 is viewed, is made equal to zero, a display pattern such as shown in FIG. 12 is obtained which is continuous in each column of display dots and therefore is easy to be viewed.

Additionally, according to the present invention, the operating margin can be made large. Therefore, even when the viewing angle θ for viewing the display surface 19 of the liquid crystal display device is large, the crosstalk will be difficult to occur. Further, when the display surface is viewed in substantially normal direction, that is, when the viewing angle θ is small, the contrast of the display pattern can be imporved. Accordingly, the field of viewing the display pattern can be widened.

In the foregoing description, the explanation has been made of a liquid crystal display device including 12 display sections arranged in two rows and six columns. However, it is to be understood that the present invention is not limited to such a device but is applicable to a liquid crystal display device including, for example, only six display sections $A_1$ to $A_6$ arranged in a single row. Further, although two liquid crystal display elements are piled in the above-mentioned embodiment, three or more liquid crystal display elements may be used as required.

Further, in the foregoing embodiment, there has been shown the display section formed of 5×8-dot matrix. However, the present invention is not limited to such a matrix, but can be applied with the same effect to a 5×7-dot matrix, 5×6-dot matrix, 5×5-dot matrix, or the like. In case where the 5×7-dot matrix is employed, electrodes in each display section included in the first liquid crystal display element are arranged to form a 5×4-dot matrix, electrodes in each display section included in the second liquid crystal display element are arranged to form a 5×3-dot matrix, and each of the first and second elements is driven by the driving method of ¼ bias with ¼ duty factor. Further, in case where the 5×6-dot matrix is employed, electrodes in each display section included in each of the first and second liquid crystal display elements are arranged to form a 5×3-dot matrix, and the first and second display elements are driven by the driving method of ⅓ bias with ⅓ duty factor. Furthermore, in case where the 5×5-dot matrix is employed, electrodes in each display section included in the first liquid crystal display element are arranged to form a 5×3-dot matrix, electrodes in each display section included in the second liquid crystal display element are arranged to form a 5×2-dot matrix, and the first and second display elements are driven by the driving method of ⅓ bias with ⅓ duty factor.

It will be understood that the present invention is not limited to the above-mentioned dot-matrix type liquid crystal display devices, but is also applicable to the previously-mentioned segment type liquid crystal display device driven by a multiplexing driving method.

We claim:

1. A liquid crystal device having a plurality of display sections arranged in at least one row, each of said display sections being formed of a plurality of common electrodes divided into a plurality of groups and a plurality of segment electrodes corresponding to said common electrodes and divided into a plurality of groups, each common electrode group including a plurality of common electrodes, each segment electrode group including a plurality of segment electrodes, common electrodes included in the corresponding common electrode groups in said plurality of display sections being connected in common in a single common electrode lead, said single common electrode lead including plural lead sections connecting said common electrodes and also said display sections, segment electrodes included in each segment electrode group in respective ones of said display sections being connected to a single segment electrode lead, said single segment electrode lead including plural lead sections connecting said segment electrode, said liquid crystal display device including a plurality of liquid crystal display elements piled in the direction perpendicular to a display surface of said liquid crystal display device, and, in each display section, at least one of adjacent common electrodes and corresponding segment electrodes being arranged in different ones of the plurality of piled liquid crystal display elements, each of said liquid crystal display elements comprising first and second transparent substrates arranged opposite to each other, a liquid crystal material disposed between said first and second substrates, said common electrodes of said groups being formed on an inner surface of said substrate, said segment electrodes being formed on an inner surface of said second substrate, a power source for selectively applying voltages having predetermined waveforms between said common electrodes of selected groups and said segment electrodes corresponding to said common electrodes of said selected groups to drive said liquid crystal display element in a time divisional fashion, and wherein each of the display sections includes a plurality of display areas, each of the display areas being delimited by a common electrode and a corresponding segment electrode, the display areas of one of said plurality of piled liquid crystal display elements being arranged in non-overlapping relationship with the display areas of others of said plurality of piled liquid crystal display elements when viewed in the direction perpendicular to the display surface of the liquid crystal device.

2. A liquid crystal display device according to claim 1, wherein two of said liquid crystal display elements are provided, said elements being piled to form a two-layer structure.

3. A liquid crystal display device having a plurality of display sections arranged in at least one row, each of said display sections being formed of a plurality of common electrodes divided into a plurality of groups and a plurality of segment electrodes corresponding to said common electrodes and divided into a plurality of groups, common electrodes included in the corresponding common electrode groups in said plurality of display sections being connected in common to a single common electrode lead, said single common electrode lead including plural lead sections connecting said common electrode and also said display sections, segment electrodes included in each segment electrode group in respective ones of said display sections being connected to a single segment electrode lead, said single segment electrode lead including plural lead sections connecting said segment electrodes, wherein said liquid crystal display device includes a plurality of liquid crystal display elements piled in the direction perpendicular to a display surface of said liquid crystal display device, each of said liquid crystal display elements comprising first and second transparent substrates arranged opposite to each other, a liquid crystal material disposed between said first and second substrates, common electrodes belonging to selected groups of said common electrode groups, said common electrodes of said selected groups being formed on an inner surface of said first substrate, segment electrodes corresponding to said common electrodes of said selected groups, said segment electrodes being formed on an inner surface of said second substrate, a power source for selectively applying voltages having predetermined waveforms between said common electrodes of said selected groups and said segment electrodes corresponding to said common electrodes of said selected groups to drive said liquid crystal display element in a time divisional fashion, wherein two of said liquid crystal display elements are provided, said elements being piled to form a two-layer structure, and in each of said display sections, said common electrodes and segment electrodes are arranged to form a matrix having a plurality of rows and columns, and said common electrodes are grouped to every one of said rows, wherein a first one of said first liquid crystal display elements is provided with common electrodes arranged in odd-numbered rows and with segment electrodes corresponding to said common electrodes in said odd-numbered rows, and a second one of said second liquid crystal display elements is provided with common electrodes arranged in even-numbered rows and with segment electrodes corresponding to said common electrodes in said even-numbered rows.

4. A liquid crystal display device according to claim 1, 2 or 3, wherein each of said liquid crystal display elements is driven by a driving method of ⅓ bias with a duty factor of ¼.

5. A liquid crystal display device according to claim 1, 2 or 3, wherein each of said liquid crystal display elements is driven by a driving method of ½ bias with a duty factor of ⅓.

6. A liquid crystal display device according to claim 1, wherein said adjacent common electrodes of a display section are arranged in different ones of said plurality of piled liquid crystal display elements.

7. A liquid crystal display device according to claim 1, wherein two liquid crystal display elements are piled to form a two-layer structure, and said adjacent common electrodes are alternately arranged in said two piled liquid crystal display elements.

* * * * *